US012355109B2

(12) United States Patent
Baseri et al.

(10) Patent No.: US 12,355,109 B2
(45) Date of Patent: Jul. 8, 2025

(54) SYSTEMS AND METHODS FOR SERVICING HIGH VOLTAGE COMPONENTS OF A BATTERY SYSTEM

(71) Applicant: Rivian IP Holdings, LLC, Irvine, CA (US)

(72) Inventors: Ehsan Baseri, Irvine, CA (US); Kyle Butterfield, Rancho Santa Margarita, CA (US); Luke Rayment Morrow, Gilroy, CA (US); Akshay Kishor Murkute, Irvine, CA (US); Jonathan Verghese, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 3 days.

(21) Appl. No.: 18/585,817

(22) Filed: Feb. 23, 2024

(65) Prior Publication Data

US 2024/0204363 A1      Jun. 20, 2024

Related U.S. Application Data

(63) Continuation of application No. 17/360,918, filed on Jun. 28, 2021, now Pat. No. 11,942,658.

(51) Int. Cl.
*B60R 13/08*  (2006.01)
*B60R 16/033* (2006.01)
(Continued)

(52) U.S. Cl.
CPC .......... *H01M 50/507* (2021.01); *B60R 13/08* (2013.01); *B60R 16/033* (2013.01);
(Continued)

(58) Field of Classification Search
CPC .................. B60R 13/08; B60R 16/033; B60R 2013/0807; H01M 2220/20;
(Continued)

(56) References Cited

U.S. PATENT DOCUMENTS

| 3,556,570 | A  | 1/1971  | Cosenza |
| 8,785,776 | B2 | 7/2014  | Richard et al. |
| 9,206,834 | B2 | 12/2015 | Tseng |
| 9,786,895 | B2 | 10/2017 | Kawata et al. |

(Continued)

FOREIGN PATENT DOCUMENTS

| EP | 3151352 A2 | 4/2017 | |
| GB | 2588769 A | 5/2021 | |
| JP | 2017216802 A | * 12/2017 | .......... H01M 2/1077 |

*Primary Examiner* — Timothy J Thompson
*Assistant Examiner* — Guillermo J Egoavil
(74) *Attorney, Agent, or Firm* — Haley Guiliano LLP

(57) ABSTRACT

A battery system for an electric vehicle includes a fixed cover, and a removable cover arranged over battery modules and a high voltage distribution system. The battery system includes a busbar arranged at least partially over a region of the battery modules and under the removable cover. The busbar includes a fixed section and a movable section, or a hinge, such that the busbar can be repositioned out of the way. The support tray includes a link between the fixed and movable sections. Floating fasteners, allowing at least one of radial float and axial float are used to secure the link to the support tray, thereby avoiding safety hazards and reducing the potential for short circuits in high voltage distribution systems or conductors thereof. The floating fasteners include a head, a neck, an engagement section, and a washer, which prevent removal from a component once installed.

19 Claims, 9 Drawing Sheets

(51) Int. Cl.
*H01M 50/503* (2021.01)
*H01M 50/507* (2021.01)
*H02B 1/20* (2006.01)
*H02B 1/30* (2006.01)

(52) U.S. Cl.
CPC ............ *H01M 50/503* (2021.01); *H02B 1/20* (2013.01); *H02B 1/30* (2013.01); *B60R 2013/0807* (2013.01)

(58) Field of Classification Search
CPC ............ H01M 50/249; H01M 50/262; H01M 50/271; H01M 50/503; H01M 50/507; H02B 1/20; H02B 1/30; Y02E 60/10
USPC ........................................................ 361/624
See application file for complete search history.

(56) References Cited

U.S. PATENT DOCUMENTS

| | | |
|---|---|---|
| 10,118,504 B2 | 11/2018 | Mastrandrea et al. |
| 10,541,519 B1 | 1/2020 | Wavering |
| 10,879,659 B2 | 12/2020 | Nguyen et al. |
| 10,910,800 B1 | 2/2021 | Baseri et al. |
| 2005/0230265 A1 | 10/2005 | De et al. |
| 2012/0237315 A1 | 9/2012 | Chiu |
| 2014/0116617 A1* | 5/2014 | Walgenbach ............ H02G 5/06 156/295 |
| 2015/0140393 A1 | 5/2015 | Yamamoto et al. |
| 2015/0260216 A1 | 9/2015 | Tseng |
| 2015/0311485 A1 | 10/2015 | Fister et al. |
| 2017/0098928 A1 | 4/2017 | Serdynski et al. |
| 2019/0221815 A1* | 7/2019 | Yanagida ............ H01M 50/524 |
| 2020/0036047 A1 | 1/2020 | Aikens et al. |
| 2022/0393312 A1 | 12/2022 | Bergin |
| 2022/0416351 A1 | 12/2022 | Baseri et al. |
| 2022/0416365 A1 | 12/2022 | Baseri et al. |

* cited by examiner

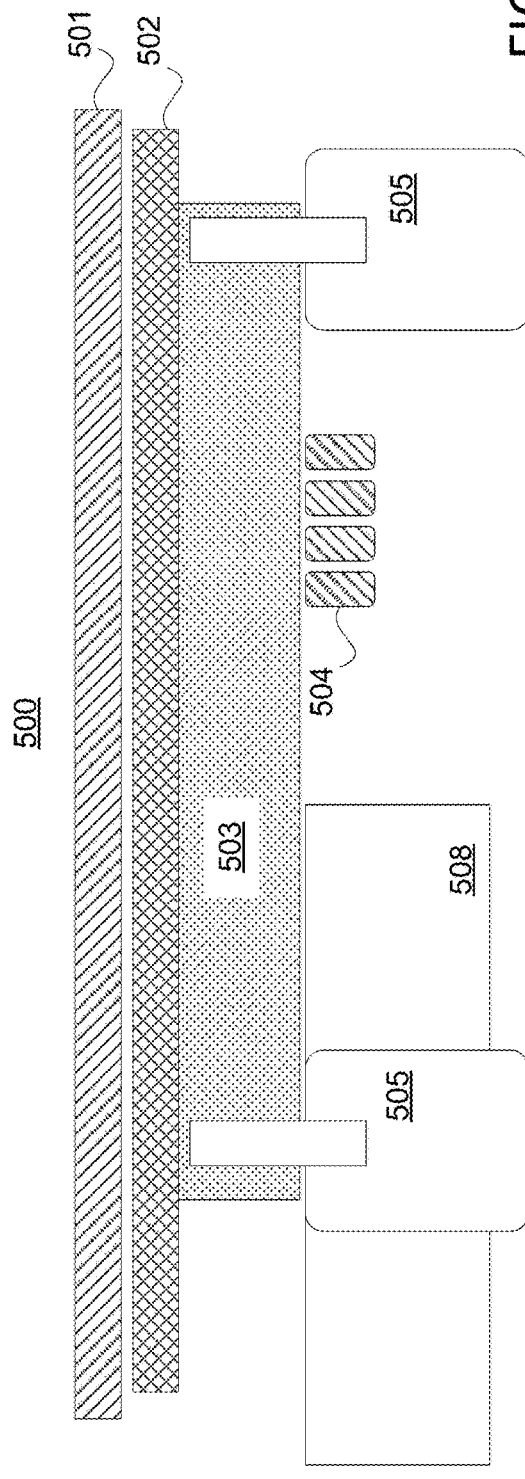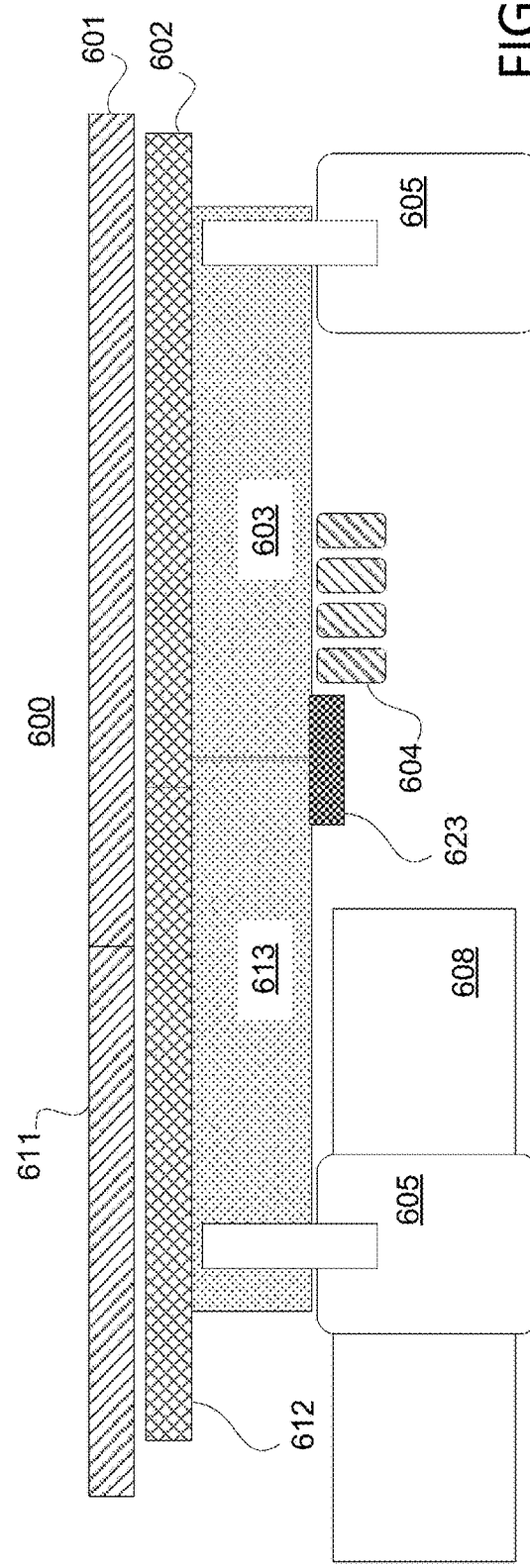

SYSTEMS AND METHODS FOR SERVICING HIGH VOLTAGE COMPONENTS OF A BATTERY SYSTEM

CROSS-REFERENCE TO RELATED APPLICATIONS

This application is a continuation of U.S. patent application Ser. No. 17/360,918, filed Jun. 28, 2021, the disclosure of which is hereby incorporated by reference herein in its entirety.

INTRODUCTION

The present disclosure is directed towards systems and methods for servicing battery system components, and more particularly towards removable and reconfigurable components that provide access to battery system components.

SUMMARY

The present disclosure is directed to systems and methods for servicing a battery system. For example, accessing and servicing High Voltage Distribution System (HVDS) components in an electric vehicle may present challenges such as incurring high service cost, requiring complex servicing procedure, requiring a specialized facility for servicing, requiring increased labor intensity, and resulting in reduced service revenue. In some embodiments, the detachable and/or foldable designs of the present disclosure enable reduced downtime and cost savings by allowing servicing without removing components to access the power electronics system (e.g., a HVDS system of an electric vehicle). For example, in some embodiments, a flexible busbar architecture and corresponding busbar supports allow for ease of serviceability and simplify complex service processes. In some embodiments, the busbar support includes a fixed/solid section and a removable/flexible section, linked by a panel or plate having floating fasteners. The floating fasteners are captive and/or tolerant to the panel/plate and are capable of radial float, axial float, or both to allow for variability in tolerances between components. To illustrate, floating fasteners may be used in any suitable location of a battery system to allow for variability in fitment and flexibility in design.

In some embodiments, the present disclosure is directed to a high voltage distribution system, possibly including a plurality of battery modules. The system includes a first fixed cover, such as a fixed portion of a lid, a removable cover, such as a removable portion of the lid, and underlying components. In some embodiments, for example, the underlying components may include a busbar of a DC bus system arranged under or partially under the removable cover. To illustrate the busbar may include a first solid longitudinal section configured to be fixed, and a second flexible longitudinal section configured to be movable. One or more of the plurality of battery modules may each be coupled to the DC bus system. The first fixed cover is arranged over the first solid/fixed section of the busbar, and may also be arranged over a first region of the battery modules, such that the first cover is fixed in place. The removable cover is arranged over the second flexible/movable section of the busbar and may also be arranged over a second region of the battery modules and the DC bus system. For example, in some embodiments, the removable portion of the cover is bolted to the fixed portion of the cover, a frame, or a combination thereof. In a further example, in some embodiments, the removable portion of the cover is configured to removed or otherwise repositioned to provide access to the high voltage distribution system.

In some embodiments, the high voltage distribution system includes power electronics arranged at least partially underneath the removable cover such that, when the removable cover is removed and the second flexible/movable section of the busbar is moved, the power electronics system may be accessible.

In some embodiments, the DC bus system includes two busbars of which the busbar described above is a first busbar interconnected with a second busbar by fasteners described herein, and the two busbars are arranged in a stacked configuration insulated from each other. For example, the first busbar may include a flat sheet of metal, the second busbar may include a flat sheet of metal, and a layer of insulating material is arranged between the busbars.

In some embodiments, the high voltage distribution system includes an insulative tray configured to at least partially isolate the busbar, and the busbar is at least partially enclosed by the insulative tray. In some embodiments, the insulative tray includes a first tray, a second tray, and a bridge. The first tray is arranged along the solid section of the busbar, the second tray is arranged along the flexible section of the busbar and is configured to be removable, and the bridge includes a plurality of floating fasteners configured to affix the first tray and the second tray.

In some embodiments, the busbar includes a hinge coupled to the first section and the second section, and the hinge is configured to be bent such that the second flexible/movable section forms an angle with the first solid/fixed section. To illustrate, the angle may be 90 degrees, between 0 and 90 degrees, greater than 70 degrees, or greater than 90 degrees. In some embodiments, the busbar includes a hinge coupled to the first solid/fixed section and the second flexible/movable section, and the hinge includes a bending stiffness less than a bending stiffness of the first section or the second section. For example, the hinge may include a mechanical hinge (e.g., with a pin) or a flex pivot (e.g., having a reduced material thickness to allow flexing). In some embodiments, the second section is flexible, and the second section is configured to achieve: (i) a first state wherein the second section is parallel to the first section and (ii) a second state wherein at least some of the second section is perpendicular to the first section while the first section is secured to the battery system.

In some embodiments, the present disclosure is directed to a method of servicing a high voltage distribution system, possibly having a plurality of battery modules and a DC bus system therein. The method includes removing a removable cover, possibly while leaving a fixed cover in place. The fixed cover is at least partially arranged over a first section of the busbar and possibly also arranged over a first region of the battery modules, and the removable cover is arranged over a second section of the busbar and possibly also arranged over a second region of the battery modules and the DC bus system. The method also includes reconfiguring, removing, and/or repositioning the second section of the busbar. Yet further, the method may include reconfiguring, removing, and/or repositioning the second section of the busbar in relation to the DC bus system, so the second section is removed from the second region of the battery modules described herein. The method allows for, for example, removing one or more components arranged under the busbar. When the busbar is reconfigured, removed, and/or repositioned, the one or more components are accessible.

In some embodiments, the busbar is in a first state where the first section and the second section of the busbar are substantially parallel to each other, and reconfiguring the second section of the busbar includes reconfiguring the second section to make the one or more components accessible, possibly referred to forming the busbar into a second state to make the components accessible.

In some embodiments, the method includes returning the busbar to being substantially parallel to the first section, possible referred to a state achieved prior to the reconfiguring. In some embodiments, one or more insulative trays at least partially enclose and/or support the busbar. In some instances, there are two insulative trays, a first tray supporting the first solid section of the busbar and a second tray supporting the second flexible section of the busbar, and there may be a bridge interconnecting the trays for additional support. The method may also include removing one or more of the insulative trays (i) after reconfiguring the busbar and (ii) prior to removing the one or more components. In some embodiments, the removable cover is configured to be parallel to the fixed cover when installed, and moving the removable cover includes arranging the removable cover at an angle to the fixed cover. In some embodiments, the method includes adjusting one or more floating fasteners configured to secure a support tray arranged along the second section of the busbar.

In some embodiments, the present disclosure is directed to a battery system including a removable cover, and a busbar stack. The removable cover may be arranged over a second region of the battery module and a DC bus system. The busbar stack may be arranged at least partially over the second region and under the removable cover. The busbar stack includes a first busbar and a second busbar, possibly arranged in layers and insulated from each other. The first busbar includes a first fixed and the second busbar includes a second movable section that is accessible via the removable cover. The second moveable section may be configured to be movable to achieve (i) a first state wherein the second busbar is flat, and (ii) a second state wherein the second busbar forms a bend without being completely removed.

In some embodiments, the first cover and the removable cover are bolted to each other such that the removable cover may be unbolted and removed. In some embodiments, the first cover and the removable cover are connected by a hinge.

In some embodiments, the battery system includes a high voltage distribution system, possibly including power electronics, arranged at least partially underneath the removable cover such that, when the removable cover is removed and the second movable section is in the second state with the bend, the power electronics system may be accessible.

In some embodiments, the battery system includes an insulative tray configured to at least partially isolate the busbar, and the busbar is at least partially enclosed by the insulative tray. In some embodiments, the insulative tray includes a first tray arranged along the solid section of the busbar, a second tray arranged along the flexible section of the busbar, and a bridge affixed to the first tray and the second tray by a plurality of fasteners.

In some embodiments, the busbar stack, or a busbar thereof, includes a hinge coupled to the first section and the second section, and the hinge is configured to be bent such that the second section forms an angle of 90 degrees with the first section. In some embodiments, the busbar includes a hinge coupled to the first section and the second section, and the hinge includes a bending stiffness less than a bending stiffness of the first section or the second section such that the second section may be moved relative to the first section by articulating the hinge. In some embodiments, the second section is flexible, and the second state corresponds to the second section being deformed from the first state.

In some embodiments, the present disclosure is directed to a floating fastener. The floating fastener includes a fastener and a washer. The fastener includes a head section ("head") arranged at a first end of the fastener, a neck section ("neck") adjacent to the head, and possibly an engagement section arranged at a second end of the fastener. For example, the first end and second ends are axial ends of the fastener. The washer is configured to be arranged at the neck and attached to the fastener. The attachment of the washer to the neck prevents removal of the floating fastener from the panel component, which thereby prevents physical contact between the floating fastener and one or more components of a battery system. The washer may be attached where it is secured to the fastener such that the washer is constrained, limited, and/or constricted to the neck section. The washer is attached to the neck section to provide one or more clearances, tolerances, and/or distances between the floating fastener and a panel component positioned between the head and the washer. The one or more clearances may include an axial clearance and/or a radial clearance with the panel component. The washer attached to the neck, the one or more clearances, and/or a combination thereof allowing the floating fastener to achieve at least one of radial float or axial float relative to a panel component.

In some embodiments, the neck includes a step or a taper feature configured to engage at least radially with the washer and the washer is attached, possibly rigidly affixed, to the feature. In some embodiments, for example, the step or taper feature includes at least one of a step or a taper positioned adjacent with the panel component, between the head and the washer. In some embodiments, the washer is attached, possibly constrained, to the neck section such that the one or more clearances include an axial clearance distance between the head and the washer which allows for the axial float. For example, the axial clearance distance between the head and the washer may be greater than the thickness of the panel component, which may include a plate. In some embodiments, the washer is attached and/or constrained to the neck section, a diameter of the neck section is configured to allow the radial float relative to a hole of the component. In some embodiments, for example, the panel component includes a panel having a hole, wherein the panel component comprises a first side and a second side opposite to the first side, and wherein the floating fastener is arranged in the hole and is captive and also tolerant to the plate by the head on the first side and the washer on the second side. For example, the neck section of the fastener may have a diameter less than a diameter of a hole of the component in which the fastener is installed, where the one or more clearances include a radial clearance between the neck and the hole of the component allowing the floating fastener to radially float in the hole. In some embodiments, the floating fastener is constrained by the panel component to exhibit the axial clearance and the radial clearance, and the panel component includes a plurality of floating fasteners, each having respective axial and radial clearances. In some embodiments, the engagement section includes a threaded section configured to engage with another component such as a busbar support section, for example.

In some embodiments, the present disclosure is directed to a busbar support component. The busbar support component includes a panel and a plurality of floating fasteners. The panel, which includes a plurality of holes, is configured to join a first support section and a second support section of a busbar, for example. Each of the plurality of floating fasteners is arranged in a respective hole of the plurality of holes. Each floating fastener includes a neck and an attached washer configured to allow at least one of radial float or axial float relative to the panel. Further, each floating fastener is configured to engage with one of the first support section and the second support section. For example, when installed, the floating fasteners provide one or more clearances, possibly including an axial clearance and a radial clearance with the panel and in some instances, the panel secures or constrains displacement of the first support relative to the second support.

In some embodiments, the first support section includes a first hole, the second support section includes a second hole, a first floating fastener of the plurality of floating fasteners is configured to engage with the first hole, and a second floating fastener of the plurality of floating fasteners is configured to engage with the second hole. In some such embodiments, the first support section includes an insert arranged in the first hole, and the second support section includes an insert arranged in the second hole.

In some embodiments, the panel includes a first side and a second side opposite the first side. For example, the first side may be the top of the panel and the second side may be the bottom of the panel. In some embodiments, each floating fastener includes a head arranged on the first side of the plate, a washer arranged on the second side of the plate, and an engagement section. The neck is arranged between the head section and the engagement section, and the engagement section is configured to engage with one of the first support section, the second support section, or both.

In some embodiments, the washer is rigidly affixed to the neck such that the washer and the head define the axial float, and the washer cannot move relative to the fastener. In some embodiments, each floating fastener is configured to allow both radial float and axial float by including radial and axial clearances.

In some embodiments, the present disclosure is directed to a method for forming a floating fastener. The method includes providing a fastener comprising a head, a neck, and possibly an engagement section. The method also includes inserting the fastener through a hole on a first side of a component, and arranging a washer on a second side of the component opposite the first side. The method further includes attaching and thereby securing the washer to the fastener to form the floating fastener such that the floating fastener is captive and also tolerant to the component. Securing the washer to the fastener provides axial clearance, radial clearance, or both.

In some embodiments, the method further comprises arranging one or more securing components relative to the fastener and the washer. In some embodiments, securing the washer to the fastener includes pressing one or more securing components to cause the fastener to engage with the washer. In some embodiments, for example, securing the washer to the fastener includes pressing one or more securing components to deform the fastener, the washer, or both to engage with each other. In some embodiments, the method includes removing the one or more securing components after securing the washer to the fastener.

In some embodiments, arranging the washer on the second side includes sliding the washer over the engagement section such that the washer is arranged at the neck of the fastener. In some embodiments, arranging the washer on the second side includes pressing the washer over the engagement section such that the washer is arranged at the neck of the fastener.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 5 shows a block diagram of an illustrative battery system having a one-piece cover, in accordance with some embodiments of the present disclosure;

FIG. 6 shows a block diagram of an illustrative battery system having a two-piece cover, in accordance with some embodiments of the present disclosure;

DETAILED DESCRIPTION

Figure 1:
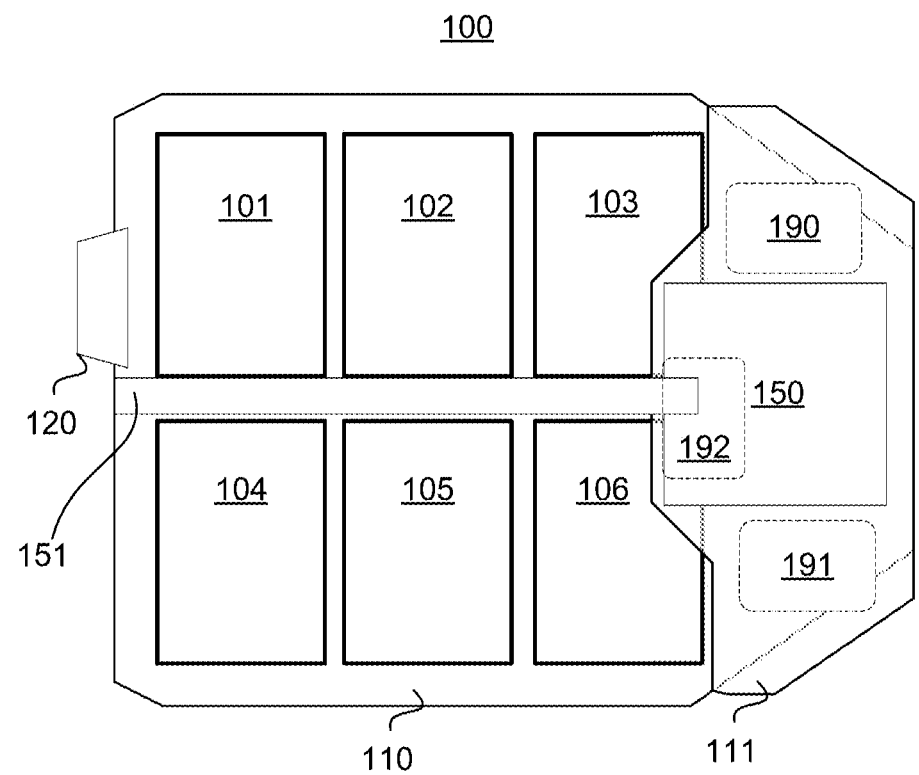
FIG. 1 shows a top view of an illustrative battery system, in accordance with some embodiments of the present disclosure.

FIG. 1 shows a top view of illustrative battery system 100, in accordance with some embodiments of the present disclosure. As illustrated, battery system 100 includes battery modules 101-106, busbar components 150 and 151, components 190-192, cover 110, cover 111, and component 120.

In some embodiments, for example, battery system 100 is configured to be installed in an electric vehicle to provide electric power to one or more drive motors of the electric vehicle. As illustrated, cover 110 is a fixed cover and cover 111 is a removable cover. For example, in some embodiments, while cover 110 may be removed, cover 110 need not be intended for removal when servicing busbar components 150 and 151, components 190-192, or a combination thereof. In a further example, cover 110 may be installed using removable fasteners (e.g., bolts, studs, nuts, or other threaded elements), irreversible fasteners (e.g., crimps, rivets, or other features that must be destroyed or altered for removal), adhesive, sealant, welds, any other suitable processing (e.g., mechanical, chemical, or thermal) and materials, or any combination thereof. As illustrated, cover 111 may be removed to service busbar components 150 and 151, components 190-192, other components, or a combination thereof, with more relative ease than removing cover 110. In a further example, cover 111 may be installed using removable fasteners (e.g., bolts, studs, nuts, or other threaded elements), seals, any other suitable processing (e.g., mechanical, chemical, or thermal) and materials that allow disengagement, or any combination thereof. In some embodiments, cover 111 is totally removable from battery system 100. For example, in some embodiments, cover 111 may be unbolted from battery system 100, removed, and set aside. In some embodiments, cover 111 is configured to be moved away from battery system 100 without total removal. For example, in some embodiments, cover 111 may be loosened (e.g., unfastened), bent out of the way, and then returned to position and re-tightened after servicing.

In some embodiments, battery modules 101, 102, 103, 104, 105, and 106 are connected in series, parallel, or a combination thereof to generate a DC bus voltage at busbar components 150 and 151. In some embodiments, components 190, 191, and 192 may include busbars, switches (e.g., contactors, transistors), shunts, sensors, resistors, inductors, capacitors, processing equipment, or any suitable combination thereof. In some embodiments, the DC bus system may include busbars configured to operate at hundreds of volts (e.g., between two busbars forming the DC bus).

Figure 2:
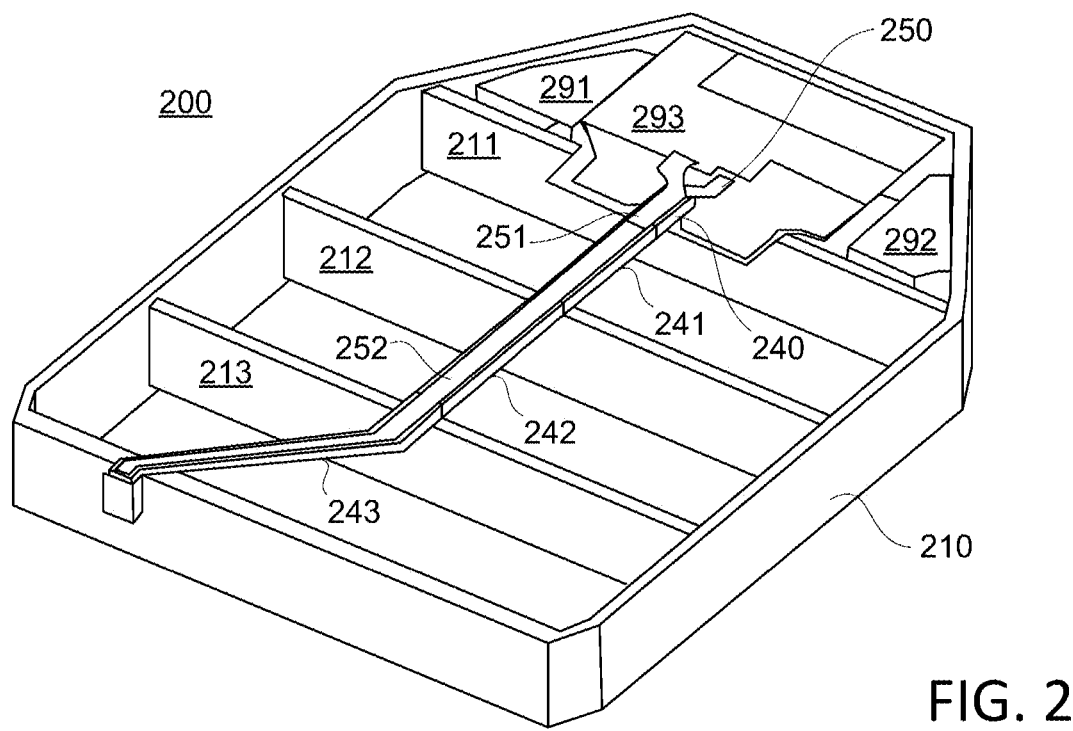
FIG. 2 shows a perspective view of a portion of an illustrative battery system, without outer covers or battery modules, in accordance with some embodiments of the present disclosure.

FIG. 2 shows a perspective view of a portion of illustrative battery system 200, without outer covers or battery modules, in accordance with some embodiments of the present disclosure. As illustrated, battery system 200 includes outer walls 210, inner walls 211-213, a DC busbar system, and components 291 and 292. The DC busbar system includes component 293, busbar sections 250-252, and support sections 240-243.

In some embodiments, busbar sections 250-251 are flexible or otherwise movable, and support section 240 is movable. For example, in order to access parts of components 291 and 292, or access components arranged beneath the DC bus system, busbar sections 250-251 and support section 240 may be moved out of the way without removing or moving the other busbar sections or support sections. Accordingly, support sections 241-243 may remain in place during servicing, and busbar section 252 may remain in place during servicing.

Figure 3:
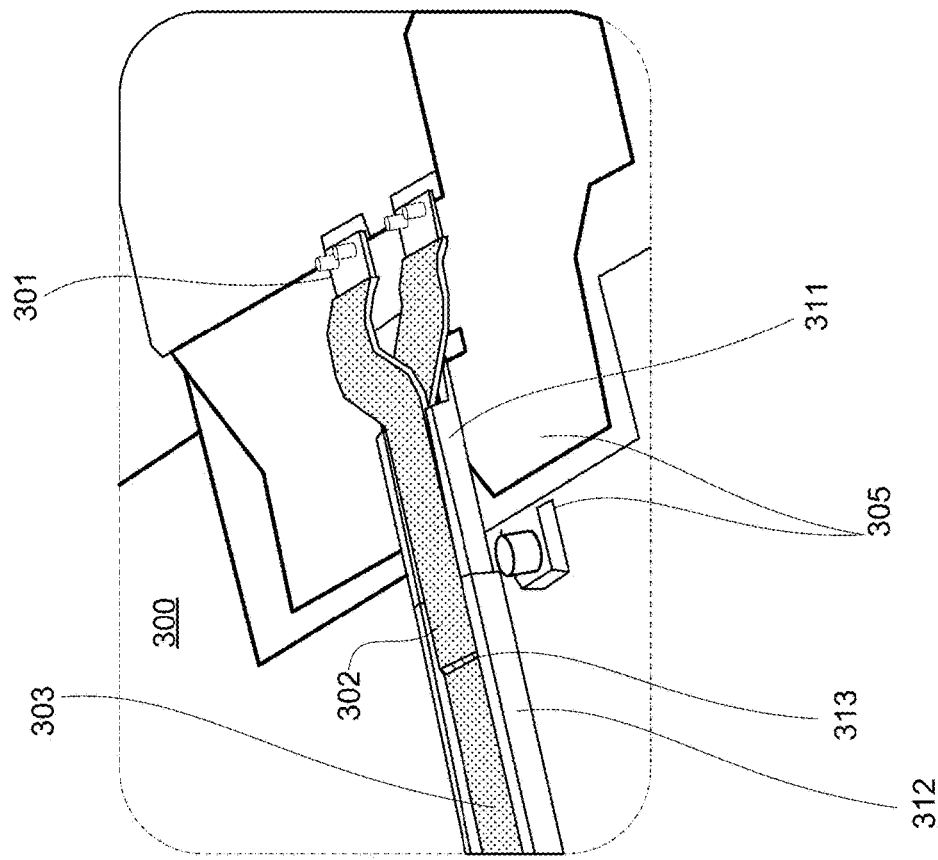
FIG. 3 shows a perspective view of a portion of an illustrative battery system, partially opened, in accordance with some embodiments of the present disclosure.

FIG. 3 shows a perspective view of a portion of illustrative battery system 300, partially opened, in accordance with some embodiments of the present disclosure. For example, as illustrated in FIG. 3, a cover may have been removed to make the busbar and other components accessible, visible, or both (e.g., via the region previously covered). Battery system 300, as illustrated, includes a busbar (having sections 301, 302, and 303), a support tray (e.g., having sections 311 and 312 coupled at interface 313), and battery components 305. As illustrated, busbar section 302 is flexible and may be bent upwards to uncover support tray section 311. The busbar includes section 301 (e.g., a fixed section), which is affixed to fasteners of battery system 300 such that busbar section 302 may be bent out of the way without removing busbar sections 301 and 302. Busbar section 303 remains fixed in support tray section 312, and both are configured to remain fixed. When busbar section 302 is moved out of the way, support tray section 311 may be removed. To illustrate, support tray section 311 may be, but need not be, the same as support tray 220 of FIG. 2. Sections 311 and 312 meet at interface 313, which may be a seam, include a hinge or flex joint, or otherwise indicate a spatial region where sections 311 and 312 abut each other.

Figure 4:
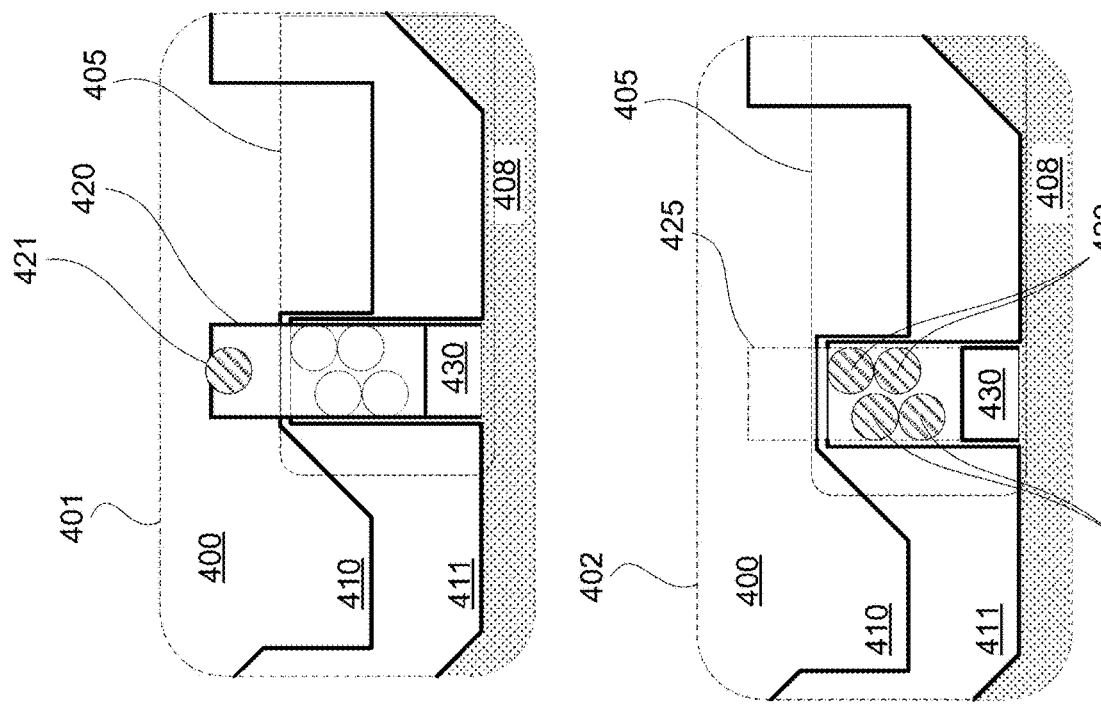
FIG. 4 shows a top view of a portion of an illustrative battery system, partially opened, in accordance with some embodiments of the present disclosure.

FIG. 4 shows a top view of a portion of an illustrative battery system 400, partially opened, in accordance with some embodiments of the present disclosure. Panel 401 illustrates a first configuration with a removable cover removed and a busbar moved out of the way. Fixed cover 408, as illustrated, is still installed. Panel 402 illustrates a second configuration with a busbar component (e.g., support tray 420) removed to access fasteners 422 arranged underneath. As illustrated in panel 401, components 405 of the power electronics system may be arranged beneath components of a DC bus system. Support tray 420 is arranged over a region of the power electronics system, and may be removed by disengaging fastener 421, as illustrated. As illustrated in panel 402, once support tray 420 is removed (e.g., or moved or otherwise deformed out of the way), fasteners 422 and other portions of the power electronics system are accessible (e.g., area 425 is accessible in panel 402). Support tray 430 is fixed in place in both panel 401 and panel 402, and together with support tray 420 forms a support for a busbar. The DC bus system includes layers 410 and 411 which may correspond to busbars, insulating layers, sensor layers, control circuitry layers, any other suitable layers, or any combination thereof, which may be coupled to a busbar or sections thereof.

In an illustrative example, a movable cover is removed (e.g., disengaging and deforming) from battery system 400. A busbar of battery system 400 is reconfigured, by moving or removing a section of the busbar out of the way (e.g., bending, folding, flexing, detaching, or otherwise changing an orientation and position of the busbar to allow access). A support for the busbar may be reconfigured by, as illustrated, removing support tray 420 by disengaging fastener 421. Removal of support tray 420 allows fasteners 422, any other suitable components, or a combination thereof to be removed. For example, as illustrated, as fasteners 422 are removed, access may be gained to components 405 or a portion thereof. To illustrate, the removal of support tray 420 may allow removal of one or more components of the battery system, servicing a power electronics system of the battery system, accessing a battery module or portion thereof, replacing one or more components of the battery system, or any suitable combination thereof.

FIG. 5 shows a block diagram of illustrative battery system 500 having a one-piece cover, in accordance with some embodiments of the present disclosure. As illustrated, battery system 500 includes cover 501, busbar 502, tray 503, components 504, mounts 505, and battery module 508. Cover 501 includes a single cover or more than one cover. For example, cover 501 may include two or more covers, of which one or more may be removable. Busbar 502 includes one section or more than one section. For example, busbar 502 may include a first section and a second section joined by a hinge such that the second section can be arranged parallel with the first section (e.g., co-planar with the first section), and also arranged at an angle to the first section (e.g., perpendicular to the first section) by rotating the hinge. In a further example, busbar 502 may include a flexible section that can be plastically or elastically deformed from a first position to a second position without disengaging the first section (e.g., the second section may be bent or folded out of the way). Tray 503 includes one section or more than one section. For example, tray 503 may include a first section and a second section joined by a hinge such that the second section can be arranged parallel with the first section (e.g., co-planar with the first section), and also arranged at an angle to the first section (e.g., perpendicular to the first section) by rotating the hinge. In a further example, tray 503 may include one or more fixed sections, one or more removable sections, or a combination thereof.

In some embodiments, components 504 include fasteners (e.g., four fasteners as illustrated), additional covers, modules (e.g., enclosed circuitry, printed circuit boards, cables, connectors, terminals, input/output interfaces, embedded processors), latches, locks, handles, electronic components (e.g., contactors, transistors, busbars, current collectors, sensors, fuses, breakers, transformers), any other suitable components, or any combination thereof. To illustrate, components 504 may include fasteners that, when removed, allow removal of an enclosure (e.g., that houses circuitry) from beneath busbar 502.

FIG. 6 shows a block diagram of illustrative battery system 600 having a two-piece cover, in accordance with some embodiments of the present disclosure. Battery system 600 may correspond to an example of battery system 500, with multipiece covers, busbars, and trays. As illustrated, battery system 600 includes cover 601, cover 611, busbar sections 602 and 612 (e.g., which together form a busbar), tray 613, tray 603, components 604, mounts 605, and battery module 608. Cover 611, as illustrated, is a fixed cover, although cover 611 need not be fixed in some embodiments. Cover 601, as illustrated, is movable to at least partially uncover the region of battery system 600 above components 604. Notably, covers 601 and 611 may be interconnected, hinged, and/or separate sections of the same cover or lid. For example, cover section 611 may be a fixed section of the cover and cover section 601 may be the removable section of the cover, among other possibilities. In some embodiments, cover 601 is removable (e.g., and may be rigid or flexible). In some embodiments, cover 601 is flexible (e.g., bendable, foldable, rollable, or otherwise deformable), and configured to remain at least partially affixed as part of battery system 600 while another part of cover 601 is moved out of the way. Busbar section 602 includes one or more layers, which may correspond to one or more current carriers (e.g., a high-voltage bus and a low-voltage bus that together form a DC bus). In some embodiments, busbar section 602 is joined to busbar section 612 by a hinge such that busbar section 602 can be arranged parallel with busbar section 612 (e.g., co-planar with), and also arranged at an angle to busbar section 612 (e.g., perpendicular to) by rotating the hinge. Notably, section 602 and 612 may be interconnected, stacked, and/or fastened by various types of fasteners described herein, such as those described for fasteners 604. In some instances, section 602 and 612 may be separate bus bars 602 and 612 that are stacked and/or interconnected with fasteners 604, among other fasteners described herein to prevent the fasteners from being removed or falling into high voltage distribution systems. In a further example, busbar 602 may include a flexible section that can be plastically or elastically deformed from a first position to a second position without disengaging busbar section 612 (e.g., busbar section 602 may be bent or folded out of the way). Tray 603 may be movable to allow access to components 604. For example, in some embodiments, tray 603 may be completely removed. In a further example, tray 603 may be joined by a hinge, flexure, plate, bracket, or any other suitable joint (e.g., as illustrated by bridge 623) to tray 613 such that tray 603 can be arranged parallel with tray 613 (e.g., co-planar with), and also arranged at an angle to tray 613 (e.g., perpendicular to) by rotating the hinge. In a further example, tray 603 may include one or more fixed sections, one or more removable sections, or a combination thereof.

In some embodiments, components 604 include fasteners (e.g., four fasteners as illustrated), additional covers, modules (e.g., enclosed circuitry, printed circuit boards, cables, connectors, terminals, input/output interfaces, embedded processors), latches, locks, handles, electronic components (e.g., contactors, transistors, busbars, current collectors, sensors, fuses, breakers, transformers), any other suitable components, or any combination thereof (e.g., similar to components 504 of FIG. 5). To illustrate, components 604 may include fasteners that, when removed, allow removal of an enclosure (e.g., that houses circuitry) from beneath busbar section 602.

Figure 7:
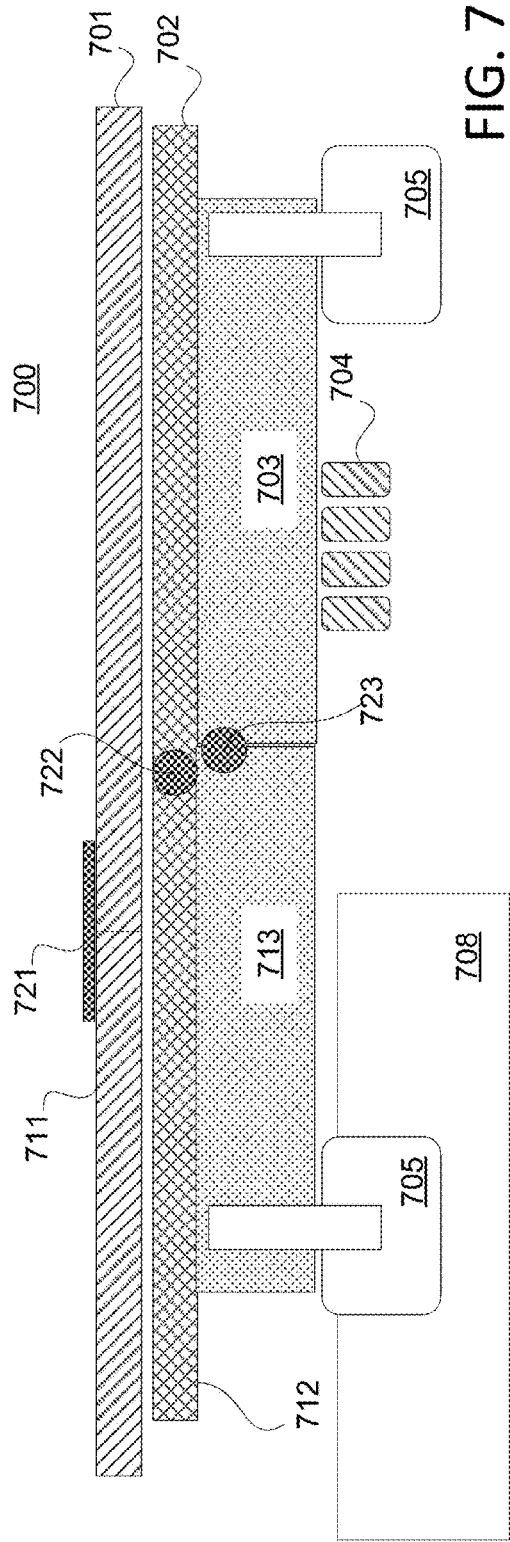
FIG. 7 shows a block diagram of an illustrative battery system having another two-piece cover, in accordance with some embodiments of the present disclosure.

FIG. 7 shows a block diagram of illustrative battery system 700 having another two-piece cover, in accordance with some embodiments of the present disclosure. Battery system 700 may correspond to an example of battery system 500 or battery system 600, with multipiece covers, busbars, and trays. As illustrated, battery system 700 includes cover 701, cover 711, busbar sections 702 and 712 (e.g., which together form a busbar), tray 713, tray 703, components 704, mounts 705, and battery module 708. Cover 711, as illustrated, is a fixed cover, although cover 711 need not be fixed in some embodiments. Cover 701, as illustrated, is movable to at least partially uncover the region of battery system 700 above components 704 by rotating hinge 721. For example, as illustrated, cover 701 is coupled to cover 711 by hinge 721, which allows relative rotation between cover 701 and 711. As illustrated, busbar section 702 is joined to busbar section 712 by hinge 722 such that busbar section 702 can be arranged parallel with busbar section 712 (e.g., co-planar with), and also arranged at an angle to busbar section 712 (e.g., perpendicular to) by rotating hinge 722. Tray 703 may be movable to allow access to components 704. For example, as illustrated, tray 703 is joined by hinge 723 to tray 713 such that tray 703 can be arranged parallel with tray 713 (e.g., co-planar with), and also arranged at an angle to tray 713 (e.g., perpendicular to) by rotating hinge 723. In some embodiments, hinge 723 is omitted, and a battery system may include a bolt on reinforcement (e.g., made of steel, or any other suitable material). To illustrate, after busbar section 702 is moved out of the way, tray 703 may be removed or moved (e.g., rotated up about hinge 723) to provide access to components 704.

In some embodiments, components 704 include fasteners (e.g., four fasteners as illustrated), additional covers, modules (e.g., enclosed circuitry, printed circuit boards, cables, connectors, terminals, input/output interfaces, embedded processors), latches, locks, handles, electronic components (e.g., contactors, transistors, busbars, current collectors, sensors, fuses, breakers, transformers), any other suitable components, or any combination thereof (e.g., similar to components 504 of FIG. 5). To illustrate, components 704 may include fasteners that, when removed, allow removal of an enclosure (e.g., that houses circuitry) from beneath busbar section 702.

Figure 8:
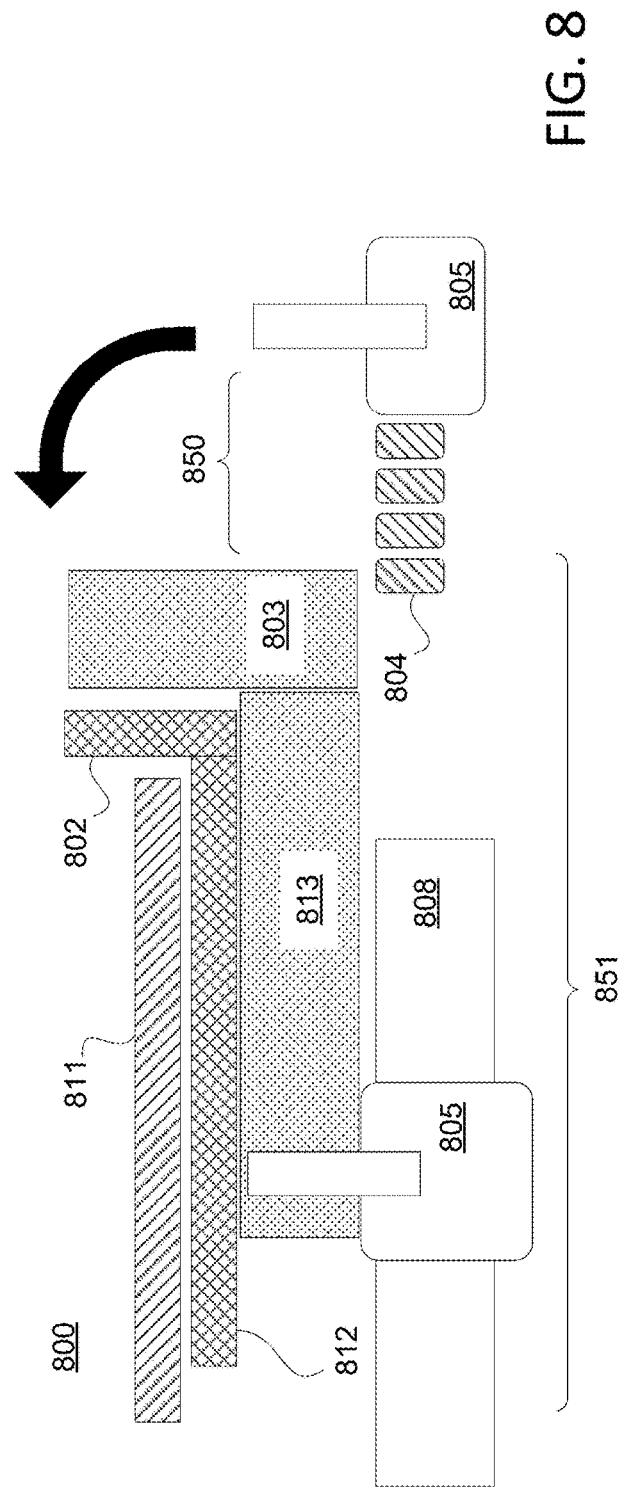
FIG. 8 shows a block diagram of an illustrative battery system opened for service, in accordance with some embodiments of the present disclosure.

FIG. 8 shows a block diagram of illustrative battery system 800 opened for service, in accordance with some embodiments of the present disclosure. Battery system 800 may correspond to an example of battery system 500, battery system 600, or battery system 700, with multipiece covers, busbars, and trays arranged for access to components 804. As illustrated, battery system 800 includes cover 811, busbar sections 802 and 812 (e.g., which together form a busbar), tray 813, tray 803, components 804, mounts 805, and battery module 808. Cover 811, as illustrated, is a fixed cover, although cover 811 need not be fixed in some embodiments. Although not illustrated, a movable cover may be removed to achieve the configuration shown in FIG. 8, uncovering region 850 of battery system 800 above components 804. As illustrated, busbar section 802 is arranged at an angle to busbar section 812 (e.g., perpendicular, as illustrated). Busbar section 802 may be arranged out of the way by actuating a hinge, deforming at least a part of either or both of busbar section 802 or busbar section 812, or a combination thereof. Tray 803 is illustrated in FIG. 8 as moved to allow access to components 804. For example, as illustrated, tray 803 can be arranged parallel with tray 813 (e.g., co-planar with), and also arranged at an angle to tray 813 (e.g., perpendicular to, as illustrated) by rotating a hinge, for example. In some embodiments, although not illustrated in FIG. 8, tray 803 may be removed completely. The curved arrow in FIG. 8 illustrates a path of tray 803 and busbar section 802 to provide access to region 850.

In some embodiments, components 804 include fasteners (e.g., four fasteners as illustrated), additional covers, modules (e.g., enclosed circuitry, printed circuit boards, cables, connectors, terminals, input/output interfaces, embedded processors), latches, locks, handles, electronic components (e.g., contactors, transistors, busbars, current collectors, sensors, fuses, breakers, transformers), any other suitable components, or any combination thereof. To illustrate, components 804 may include fasteners that, when removed, allow removal of an enclosure (e.g., that houses circuitry) from beneath busbar section 802.

Figure 9:
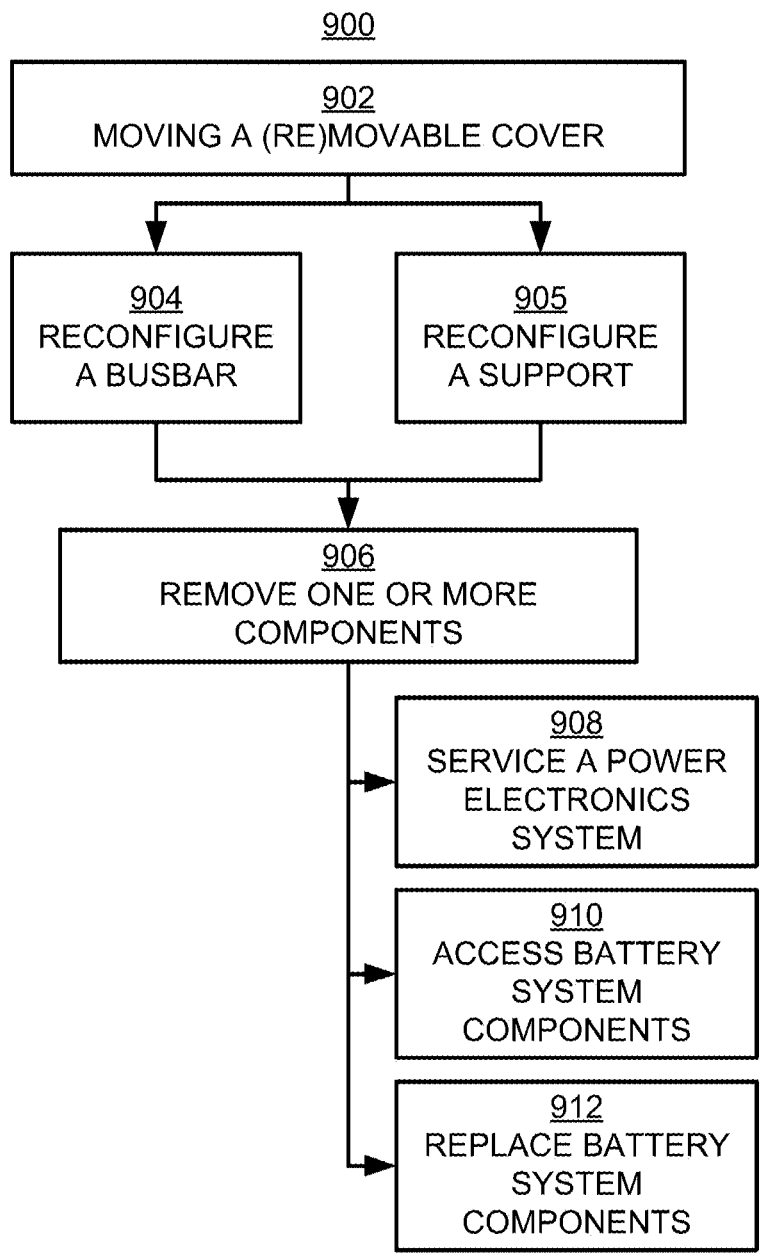
FIG. 9 shows a flowchart of an illustrative process for managing a battery system, in accordance with some embodiments of the present disclosure.

FIG. 9 shows a flowchart of illustrative process 900 for managing a battery system, in accordance with some embodiments of the present disclosure. To illustrate, process 900 or any suitable steps thereof may be applied to any or all of the battery systems of FIGS. 1-8. For example, process 900 may be used to service a High Voltage Distribution System arranged at least partially under a busbar.

Step 902 includes moving (e.g., disengaging and deforming) a movable cover (e.g., a removable cover) of the battery system. In some embodiments, the movable cover may be removed completely from the battery system to allow access. In some embodiments, the movable cover is configured to be bent, folded, flexed, rolled, or otherwise deformed out of the way without detaching the movable cover completely.

Step 904 includes reconfiguring a busbar of the battery system. In some embodiments, step 904 includes reconfiguring a busbar of the DC bus system to be arranged out of a region of the battery system without removing the entire busbar or a significant fraction thereof. The region may be position over a part of the battery modules or other components, thus allowing access to the battery modules or other components. Step 904 may include, for example, bending, folding, flexing, detaching, or otherwise changing an orientation and position of the busbar to allow access. In some embodiments, the busbar may include a hinge, flexure, or any other suitable joint to allow portions of the busbar to be moved or otherwise re-oriented relative to each other. In some embodiments, step 904 may include removing one or more sections of the busbar.

Step 905 includes reconfiguring a support of the battery system. Step 905 may be optional, and may be omitted, included, or combined with another step of process 900. Step 905 may include, for example, bending, folding, flexing, detaching, or otherwise changing an orientation and position of the support to allow access. In some embodiments, the support may include a hinge, flexure, or any other suitable joint to allow portions of the support to be moved or otherwise re-oriented relative to each other. To illustrate, a support may include a tray, as illustrated in FIGS. 2-8, any other suitable structure, or any combination thereof. In some embodiments, step 905 may include removing one or more sections of the support. Step 905 may be performed before, after, or simultaneously with step 904, for example.

Step 906 includes removing (e.g., disengaging and placing apart) one or more components of the battery system. In some embodiments, the components of step 906 include fasteners, latches, covers, enclosures, braces or other structures, electronic components (e.g., control modules, processors, power electronics), any other suitable parts of a battery system, or any combination thereof.

Step 908 includes servicing a power electronics system of the battery system. In some embodiments, step 908 includes accessing an HVDS of the electric vehicle. In some embodiments, step 908 includes accessing one or more modules for conditioning the DC bus. Step 910 includes accessing one or more components of the battery system. In some embodiments, step 910 includes accessing a battery module or portion thereof. In some embodiments, step 910 includes accessing the busbar itself (e.g., a fixed section, a removable section, a movable section, or another part of the busbar). Step 910 may include accessing, for example, a battery module, a battery cell, a current collector, a fusible link to a battery cell, a carrier, a cooling plate, a cover plate, any other suitable components, or any combination thereof. Step 912 includes replacing one or more components of the battery system. In some embodiments, one or more of steps 908, 910, and 912 may be combined, omitted, or otherwise modified in accordance with the present disclosure.

In some embodiments, process 900 may be applied to architectures and battery systems having flexible busbars and/or covers, foldable busbars and/or covers, detachable busbars and/or covers, or any combination thereof that enable reduced downtime and cost savings for service. By not requiring removal of all the components (e.g., including fixed covers) to access components of the vehicle (e.g., HVDS of an electric vehicle), process 900 may benefit servicing.

Process 900 may be reversed to restore the battery system to a covered configuration ready for normal operation. For example, disengaged or moved components may be re-engaged and returned to a position for normal operation. To illustrate, referencing FIG. 8, at step 902, a removable cover may be moved or removed from battery system 800. At step 904, busbar section 802 may be moved out of the way. At step 905, tray 803 may be moved out of the way. Any or all of steps 906, 908, 910, and 912 may then be performed. Then, step 905 may be reversed by returning tray 803 to its first position (e.g., a horizontal position, as illustrated). Step 904 may be reversed by returning busbar section 802 to its first position (e.g., a horizontal position, as illustrated). Finally, step 902 may be reversed, and the removable cover may be returned to its first position, covering the previously accessible region. To illustrate further, referencing FIG. 8, process 900 may be used to gain access to region 850, while the rest of the battery system (e.g., another region, illustrated as corresponding to region 851) remains inaccessible or less accessible. By moving or removing sections of the busbar and tray, region 850 is opened (e.g., from the top, as illustrated), and is thus accessible for servicing, inspection, or any other suitable in situ actions.

In an illustrative example, process 900 may be applied to a battery system having a flexible busbar and a detachable support (e.g., a detachable tray). The detachable support may include two parts, of which one is fixed and one is detachable. In some embodiments, the fixed part of the support (e.g., the fixed tray or fixed tray portion) is mounted to a frame of the battery system and need not change its position during servicing (e.g., need not be detached, moved, or deformed), while the detachable part is moved, deformed, or removed during servicing. The fixed and detachable parts of the support may be connected by a reinforcement (e.g., bolt on, adhered), a hinge, or any other suitable joint. In some embodiments, the battery system includes a longitudinal, high-voltage busbar assembly made of solid and flexible portions connected by rivets, brazing, any other joining means, or any combination thereof. For example, the busbar may rest on a support tray. During servicing, an operator may unscrew a fastener for the flexible busbar (e.g., at step 904), rotate the flexible portion of the busbar (e.g., at step 904), and then unscrew the fasteners used to mount the detachable support tray to the frame (e.g., at step 905). The operator may then unscrew the fasteners on the bolt-on reinforcement and completely remove a detachable portion of support tray (e.g., at step 905). After the detachable support tray is removed from the assembly, the operator may then have access to the service fasteners of a HVDC (e.g., at step 908).

In another illustrative example, process 900 may be applied to a battery system having a flexible busbar and a flexible support. In some embodiments, a busbar support tray is partitioned into two parts or halves, of which one is fixed during operation and the other is foldable, bendable, or otherwise flexible. The fixed part may be mounted to the battery frame and need not change position during servicing. The foldable part may be rotated during the service for clearance and accessibility. The fixed and foldable parts may be connected by a mechanical hinge, snap mechanism, any other suitable foldable mechanism, or any combination thereof. In some embodiments, the busbar (e.g., a longitudinal, high-voltage busbar assembly) is made of a solid portion and a flexible portion connected by rivets, brazing, soldering, fasteners, any other suitable affixment, or any combination thereof. In some embodiments, the busbar is configured to rest on one or more support trays. During servicing, an operator may unscrew a fastener for the flexible busbar, rotate the flexible portion of the busbar (e.g., out of the way), and then unscrew further fasteners used to mount the foldable support tray to the frame. The operator may rotate the movable part of the support tray out of the way. After the movable part of the support tray is cleared from the assembly, the operator may then have case of access to service fasteners of the HVDS, for example.

In another illustrative example, process 900 enables case of access for the operator during servicing of a HVDS, and reduces the delivery down-time after servicing. For example, in some embodiments, process 900 eliminates or otherwise lessens the need of complete overhauling of the energy storage system for servicing and allows a more concentrated effort on the part of the system which must be serviced. Process 900 allows system designs that are also cost-effective, eliminate complete overhauling of energy systems, reduce servicing cost, reduce complex servicing problems, require less labor-intensive activity, mitigate higher service scrap cost, or a combination thereof.

Figure 10:
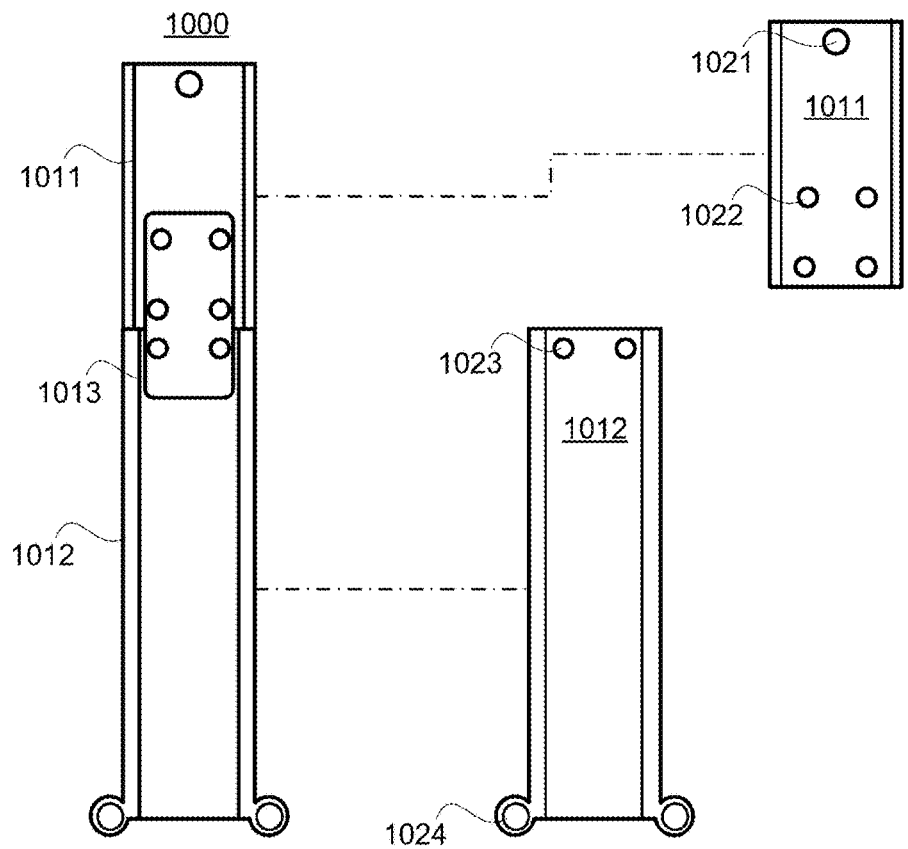
FIG. 10 shows top views of an illustrative assembly of a battery system, in accordance with some embodiments of the present disclosure.

FIG. 10 shows top views of illustrative assembly 1000 of a battery system, in accordance with some embodiments of the present disclosure. To illustrate, assembly 1000 may correspond to the support tray of FIGS. 3-4 (e.g., having sections 311 and 312 in FIG. 3). In some embodiments, support tray sections 1011 and 1012 are joined together using component 1013, which may include a fastened plate, a clip, a clamp, any other suitable affixing mechanism, or any combination thereof. In some embodiments, component 1013 may include a hinge or other movable joint configured to allow support tray section 1011 to be moved out of the way. Support tray sections may, but need not include the same material, and may be made of plastic (e.g., polycarbonate such as RTP 301 FR or any other suitable plastic), glass-filled plastic, coated metal, any other suitable material, or any combination thereof (e.g., metal-reinforced plastic).

As illustrated in the individual views, support tray section 1011 includes mounting feature 1021 for removing support tray section 1011 from the battery system, and coupling features 1022 (e.g., four total, as illustrated) for coupling support tray section 1011 to component 1013. As illustrated in the individual views, support tray section 1012 includes mounting features 1024 (e.g., two total, as illustrated) for affixing support tray section 1012 to the battery system (e.g., to a frame, another support tray section, or any other suitable component), and coupling features 1023 (e.g., two total, as illustrated) for coupling support tray section 2012 to component 1013. It will be understood that each of support tray sections 1011 and 1012 may include any suitable number of mounting features, coupling features, or both, in accordance with the present disclosure. In some embodiments, any or all of coupling features 1022 and 1023 may include metal inserts, through holds, studs, threaded holes, blind holes, any other suitable features for affixing to component 1013, or any combination thereof. In some embodiments, any or all of mounting features 1021 and 1024 may include inserts (e.g., metal inserts), through holds, studs, threaded holes, blind holes, bushings, any other suitable features for affixing to a component of a battery system, or any combination thereof. For example, any or all of mounting features 1021 and 1024 may include compression limiters.

In an illustrative example, referencing process 900 of FIG. 9, a busbar section may be moved out of the way at step 904. At step 905, support tray section 1011 may be removed by disengaging fasteners at mounting feature 1021 and coupling features 1022. Component 1013 may be removed as part of step 905 of FIG. 9.

Figure 11:
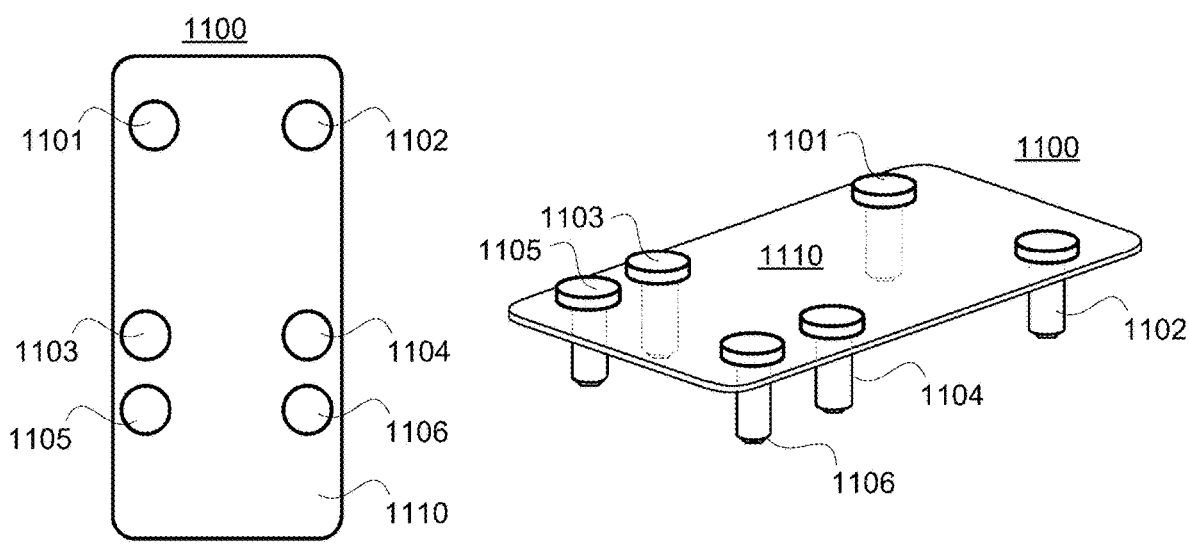
FIG. 11 shows a top view and a perspective view of a component having floating fasteners, in accordance with some embodiments of the present disclosure.

FIG. 11 shows a top view and a perspective view of component 1100 (e.g., the same as component 1013 of FIG. 10) having fasteners 1101-1106, in accordance with some embodiments of the present disclosure. In some embodiments, plate 1110 of component 1100 is made from sheet metal. For example, plate 1110 may be steel, stainless steel (e.g., 316 stainless steel), or any other suitable metal, having any suitable thickness (e.g., 1 mm, less then 1 mm, or greater than 1 mm). In some embodiments, fasteners 1101-1106 may be floating fasteners, having the ability to float radially and/or axially, as disclosed in the context of FIGS. 12-13. While illustrated as having six fasteners, component 1100 may include any suitable number of fasteners (e.g., two, or more than two) of any suitable type (e.g., threaded holes, threaded studs, through holes, slots, inserts). The fasteners 1101-1106 are prevented from detaching from plate 1110, minimizing risks of a short circuit in a high voltage distribution system and avoiding potential safety hazards during maintenance or servicing.

Figure 12:
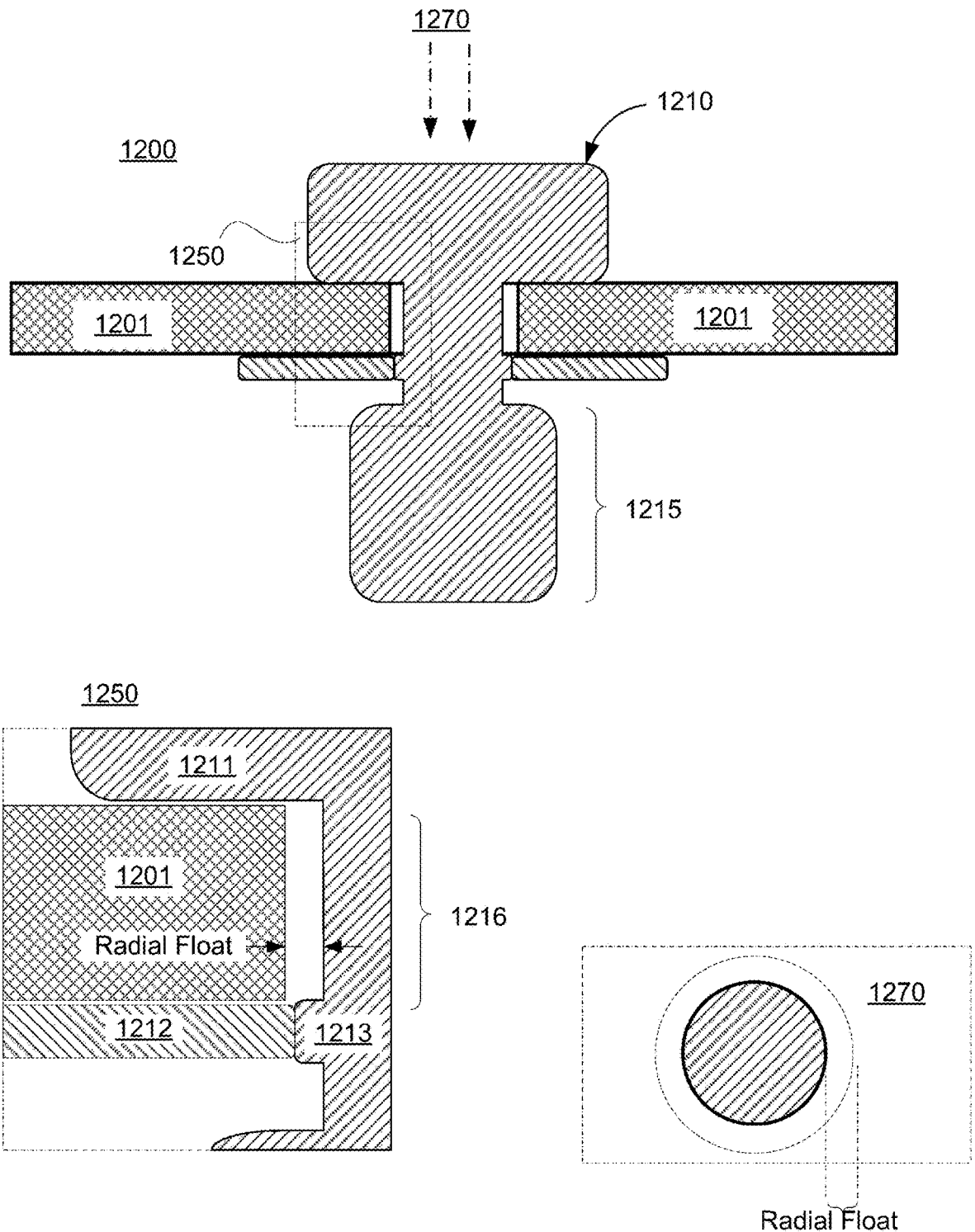
FIG. 12 shows several views of an illustrative floating fastener installed in a component, in accordance with some embodiments of the present disclosure.

FIG. 12 shows several views of an illustrative floating fastener 1210 installed in a component (e.g., plate 1201 as illustrated), in accordance with some embodiments of the present disclosure. View 1200 includes a cross-sectional side view of floating fastener 1210 installed in plate 1201. View 1250 shows an enlarged view of the interface between floating fastener and plate 1201. As illustrated in views 1200 and 1250, floating fastener 1210 includes engagement section 1215, neck 1216, head 1211, and washer 1212. Neck 1216 is arranged in a through hole of plate 1201. Because the hole is larger than neck 1216 (e.g., has a larger diameter than neck 1216), neck 1216 is able to radially float within the hole. The length of neck 1216 is at least the thickness of plate 1201, nominally, and may be larger to allow for additional axial float. For example, floating fastener 1210 may achieve a set of positions in the plane of plate 1201, defined by the hole, but is captive in the plate (e.g., will not fall or separate from the plate). In a further example, floating fastener 1210 may be free to rotate relative to plate 1201. Head 1211 and washer 1212 provide axial limits to fastener 1210 when installed in plate 1201, allowing floating fastener 1210 to axially float. Engagement section 1215, as illustrated, may include a threaded section or any other suitable type of engagement for securing floating fastener 1210 to a support structure. In some embodiments, for example, engagement section 1215 includes male threads configured to engage female threads of a support tray section. Top cross-sectional view 1270 shows neck 1216 arranged in a hole, with the radial float indicated in text. Because neck 1216 has a reduced diameter as compared to the hole of panel 1201, floating fastener 1210 may be displaced radially while still being captive by plate 1201.

To illustrate, fasteners that are free (e.g., unconstrained from displacement) present the risk of falling into the workspace. The use of floating fasteners, which are spatially constrained with a predetermined amount of radial and axial float may help to reduce the ability of the fastener to stray from its intended position. The use of floating fasteners, such as floating fastener 1210, may result an increased number of degrees of freedom (e.g., as compared to a completely fixed fastener), ability to float radially and axially, ability to accommodate assembly variation (e.g., to accommodate tolerance variation in the assembly), a variable tolerance for adapting to multiple types of terrains (e.g., off-road, on-road, dirt, rocky, snow, rain, and/or fog, among others), reduce possibility of the fastener coming in contact with undesirable components (e.g., components at differing voltages), reduced effort or labor in installation, reduced packaging space, reduced, profile, or a combination thereof. In some embodiments, floating fastener 1210 includes a low-profile floating screw (e.g., head 1211 may be thin such as 2 mm or less) and allows more degrees of freedom for the joint (e.g., than a hole or a fixed stud). In some embodiments, a floating fastener includes flaring (e.g., on either the washer, head, or neck) to attach a washer to the neck or neck/head interface (e.g., a floating screw is not rigidly connected to the plate). As illustrated, flared feature 1213 engages with washer 1212 such that washer 1212 is constrained to the fastener (e.g., the washer, head, neck, and engagement section form a rigid body). To illustrate, the axial clearance between the fastener head 1211 and washer 1212 may allow axial clearance (e.g., axial float), while the radial clearance between the neck and the plate may allow radial clearance (e.g., radial float). Accordingly, the floating fastener 1210 is allowed flexibility to move axially and radially without compromising the joint strength or otherwise lessening the impact on joint strength. Further, once installed, the floating fastener 1210 is connected, secured, and/or attached to the plate, possibly even after disassembly. This affixment may prevent the fastener from undesired contact with other components (e.g., by falling or otherwise becoming unaffixed), such as a floating fastener 1210 or the plate 1201 falling to the battery system below causing short-circuits and potential safety hazards. In particular, the washer 1212 may be attached to the neck 1216 such that the attachment secures the floating fastener 1210 to the plate 1201, such that the washer attachment to the neck 1216 prevents the floating fastener 1210 from being separated from the plate 1201. The attachment prevents the floating fastener 1210 from making physical contact to one or more batteries, battery components, and/or high voltage components located below the floating fasteners 1210. In some embodiments, because the floating fastener is attached to the plate it may be less labor intensive to install, remove, or re-install the fastener. To illustrate, if a fastener were to fall into the battery system, contact with conductors could cause an electrical short circuit condition that could damage components of the battery system.

Figure 13:
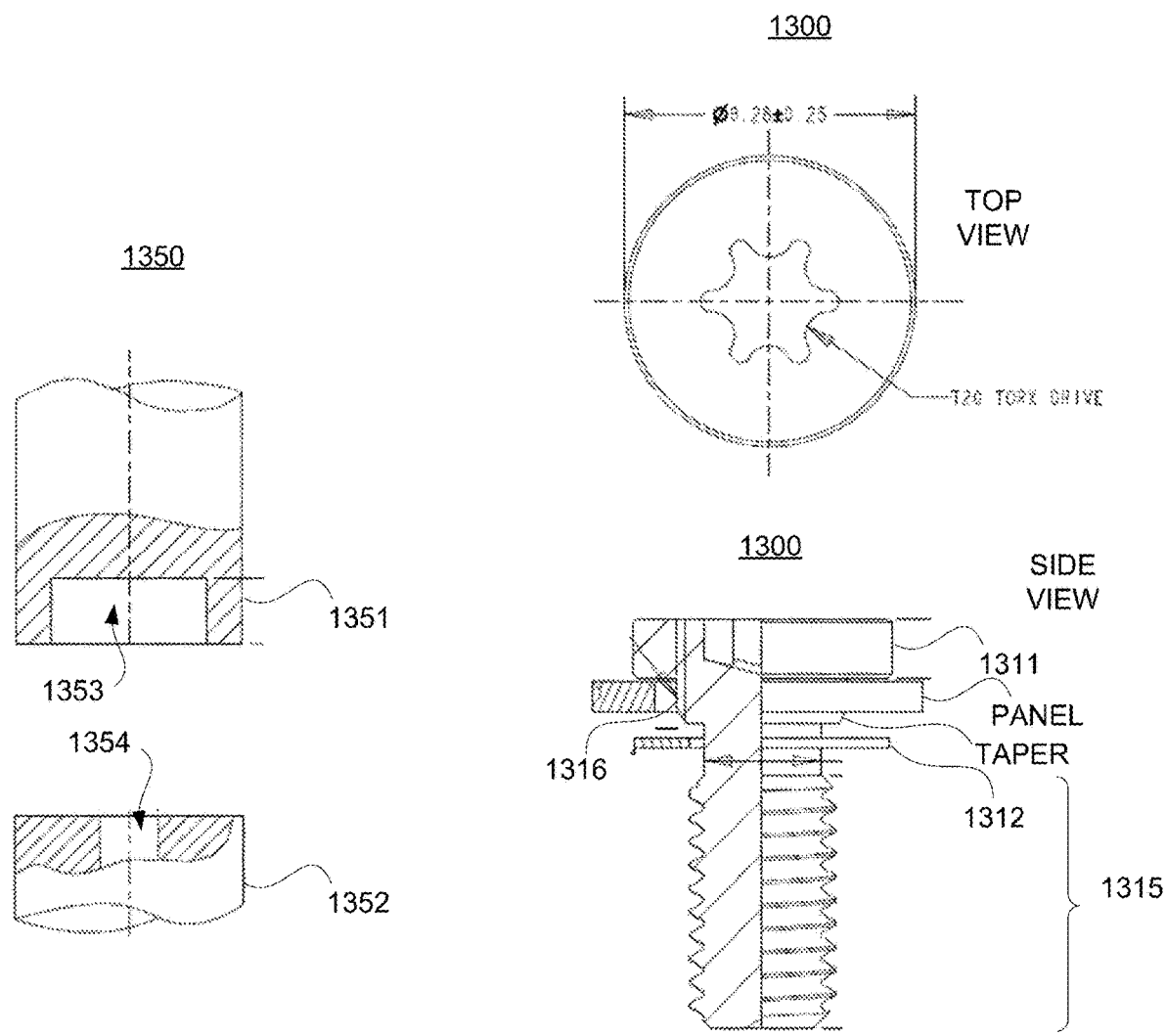
FIG. 13 shows several views of an illustrative floating fastener, in accordance with some embodiments of the present disclosure.

FIG. 13 shows several views of illustrative floating fastener 1300, in accordance with some embodiments of the present disclosure. Floating fastener 1300 represents one embodiment of a floating fastener, having a particular design, although it will be understood that a floating fastener may include any suitable dimensions and may be formed according to any suitable process (e.g., process 1400 of FIG. 14). As illustrated in the side view, floating fastener 1300 includes threaded section 1315 (an engagement section), neck 1316, head 1311, and washer 1312. Neck 1316 is configured to be arranged in a through hole of a panel. Because neck 1316 has a smaller diameter than the hole, neck 1316 is configured to radially float within the hole. The length of neck 1316, as illustrated, is configured to be larger than the thickness of the panel, and thus is able to axial float. As illustrated, floating fastener 1300 may represent a captive washer, or a pre-secured washer (e.g., an assembly where the washer has not yet been pressed onto the tapered section of the neck. To illustrate, the diameter of the neck may vary, allowing the washer to float freely before the fastener is fastened. Once fastened, the washer will move upwards until it abuts against the protrusion of the larger diameter section. In some embodiments, the washer may be slid or jostled past threaded section 1315 to the neck (e.g., can be rotated through the threaded section at a slight angle consistent with thread pitch). For example, the inner diameter of the washer may be greater than the minimum diameter of the threaded section and less than the maximum diameter of the threaded section, or the inner diameter of the washer may be greater than the maximum diameter of the threaded section. To illustrate, in some embodiments, the washer may just fit over the engagement section such that the washer does not easily fall off the assembly (e.g., before pressing or installation).

Press components 1350 include punch 1351 and anvil 1352, which are configured to secure washer 1312 onto the neck of floating fastener 1300. Punch 1351 includes recess 1353 configured to accommodate head 1311. Anvil 1354 includes recess 1354 configured to accommodate engagement section 1315. To illustrate, punch 1351 is arranged around head 1311, and anvil 1352 is arranged around threaded section 1315, and then punch 1351 and anvil 1352 are pressed together to force washer 1312 onto the tapered section (e.g., flaring).

Figure 14:
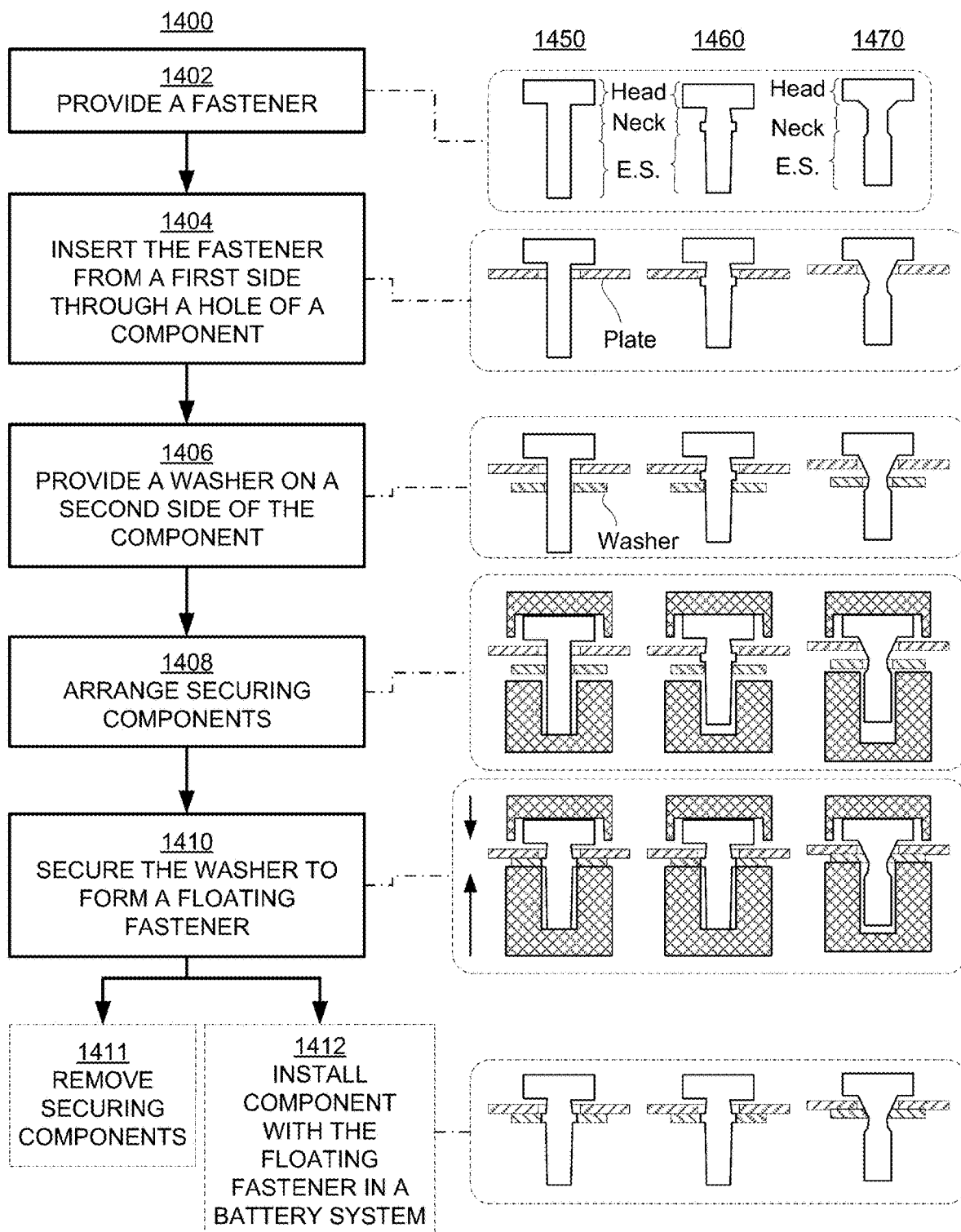
FIG. 14 shows a flowchart of an illustrative process for installing a floating fastener, in accordance with some embodiments of the present disclosure.

FIG. 14 shows a flowchart of illustrative process 1400 for installing a floating fastener on a component, in accordance with some embodiments of the present disclosure.

Step 1402 includes providing a fastener. In some embodiments, the fastener includes a head, a neck section, and an engagement section. In some embodiments, the engagement section includes threads. In some embodiments, the engagement section includes a cylindrical boss (e.g., a pin), to which threads are applied after securement. In some embodiments, the head includes a feature for turning such as a slot, a cross-slot, a male or female hex, a male or female polygonal prism (e.g., a square or triangular hole or boss feature), one or more blind holes, a male or female pattern (e.g., a Torx feature), any other suitable feature for applying torque to tighten and loosen the fastener or otherwise turn the fastener, or any combination thereof. In some embodiments, the head includes a tapered section, a lip, a step, any other suitable feature, or any combination thereof at the interface with the neck. The neck exhibits a cross-sectional length scale (e.g., a width or diameter) that is less than the head, and either less than or equal to the cross-sectional length scale of the engagement section. To illustrate, columns 1450, 1460, and 1470 of the corresponding panel (e.g., connected with an indicator line) show illustrative fasteners, in accordance with some embodiments of the present disclosure.

Step 1404 includes inserting the fastener from a first side through a hole of the component. For example, as illustrated the component includes a plate, with the plate including one or more holes, and step 1404 includes arranging the fastener in one of the holes. To illustrate, the fastener may be inserted such that the head is in contact with, or nearly in contact with, the first side of the plate. In some embodiments, the plate is oriented horizontally and the fastener is lowered from above through the hole until the head rests on the top side of the plate. To illustrate, columns 1450, 1460, and 1470 of the corresponding panel (e.g., connected with an indicator line) show the respective fasteners inserted such that the respective heads are nearly in contact with the first side of the plate, in accordance with some embodiments of the present disclosure.

Step 1406 includes providing a washer on a second side of the component. In some embodiments, the washer is pushed, screwed, or pressed on the fastener from the second side such that it is arranged axially at the neck of the fastener. For example, the inner diameter or otherwise hole size of the washer may be larger than (e.g., slid on), smaller than (e.g., pressed on), or equal to (e.g., slid on or jostled on) the diameter of otherwise width of the engagement section. In some embodiments, the component (e.g., a plate) is oriented horizontal and the washer is raised, from below, above the engagement section such that the washer is arranged along the neck section (e.g., at some axial location along the neck). To illustrate, columns 1450, 1460, and 1470 of the corresponding panel (e.g., connected with an indicator line) show the respective washers inserted such that the respective washers are at the respective neck sections, in accordance with some embodiments of the present disclosure.

Step 1408 includes arranging securing components. The securing components may include a die, an anvil, a punch, a spacer, any other suitable component, or any combination thereof. In some embodiments, step 1408 includes aligning one or more dies, stamps, anvils, or any other suitable components with the fastener, the component (e.g., the plate), the washer, or a combination thereof. To illustrate, columns 1450, 1460, and 1470 of the corresponding panel (e.g., connected with an indicator line) show press components (e.g., a die and anvil) arranged relative to the fastener, in accordance with some embodiments of the present disclosure Step 1410 includes securing the washer to the fastener to form a floating fastener. In some embodiments, step 1410 includes deforming the washer onto the fastener. For example, the fastener may be flared onto a tapered or stepped part of the head or neck (e.g., plastically deforming while engaging the fastener). In some embodiments, step 1410 includes deforming the fastener to engage the washer and lock the washer onto the fastener. For example, a section of the fastener may be deformed (e.g., flared outward, flattened, or extruded) to press against the washer and form a press fit. In some embodiments, step 1410 includes pressing the assembly such that both the washer and fastener are deformed (e.g., plastically deformed to engage each other to form a press fit). For example, the fastener may be widened and the washer may be pressed onto the widened section to form the floating fastener. The floating fastener exhibits radial float, axial float, or both radial and axial float (e.g., at least one of radial float and axial float). To illustrate, the washer is rigidly affixed to the neck of the fastener such that the washer and the head section define the axial float and the washer cannot move relative to the fastener. In some embodiments, step 1410 includes removing the one or more securing components after securing the washer to the fastener.

Step 1412 includes installing the plate with floating fastener in an assembly such as a battery system (e.g., a busbar system thereof). In some embodiments, steps 1402-1410 are performed for a plurality of fasteners (e.g., more than one fastener), to form a plate having a plurality of floating fasteners. To illustrate, the component may be installed as a link between busbar sections to allow a busbar section to be removed for servicing. It will be understood that the floating fastener may be used to attach any suitable component to any suitable mounting structure. To illustrate, step 1412 may include adjusting one or more floating fasteners configured to secure a support tray arranged along the busbar system (e.g., a flexible or otherwise movable section of the busbar).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:
1. A voltage distribution system, comprising:
   a busbar comprising:
      a solid section,
      a flexible section, and
      a hinge coupled to the solid section and to the flexible section;
   a fixed portion of a lid arranged over the solid section;
   a removable portion of the lid arranged over the flexible section, wherein the removable portion at least partially covers power electronics that control distribution of electricity from a plurality of batteries.

2. The voltage distribution system of claim 1, wherein the removable portion of the lid is coupled to the fixed portion of the lid.

3. The voltage distribution system of claim 1, wherein the power electronics are accessible when the removable portion of the lid is removed and the flexible section is articulated towards the solid section via the hinge.

4. The voltage distribution system of claim 1, wherein the busbar is at least partially enclosed by an insulative tray.

5. The voltage distribution system of claim 4, wherein the insulative tray comprises:
   a removable tray;
   an affixed tray arranged along the solid section of the busbar; and
   a plurality of floating fasteners that couple the removable tray to the affixed tray.

6. The voltage distribution system of claim 1, wherein the hinge enables the flexible section of the busbar to rotate relative to the solid section of the busbar to form an angle of 70-90 degrees with the solid section.

7. The voltage distribution system of claim 1, wherein the flexible section elastically deforms between a first position where the flexible section is parallel to the solid section and a second position where the flexible section forms an angle with the solid section.

8. A battery system comprising:
   a lid comprising a fixed portion and a removable portion, wherein the removable portion at least partially covers power electronics that control distribution of electricity from a plurality of batteries; and
   a busbar comprising a solid section and a flexible section coupled by a hinge, wherein:
      the solid section is arranged below the fixed portion, and
      the flexible section is accessible via the removable portion.

9. The battery system of claim 8, wherein the fixed portion and the removable portion are connected by a hinge assembly.

10. The battery system of claim 8, further comprising:
   the plurality of batteries is arranged under the fixed portion of the lid.

11. The battery system of claim 8, wherein the power electronics are accessible when the removable portion is removed and the flexible section is articulated towards the solid section via the hinge.

12. The battery system of claim 8, wherein the busbar is at least partially enclosed by an insulative tray.

13. The battery system of claim 12, wherein the insulative tray comprises:
   a removable tray;
   an affixed tray arranged along the solid section of the busbar; and
   a plurality of floating fasteners that couple the removable tray to the affixed tray.

14. The battery system of claim 8, wherein the hinge enables the flexible section of the busbar to rotate relative to the solid section of the busbar to form an angle of 70-90 degrees with the solid section.

15. The battery system of claim 8, wherein the flexible section elastically deforms between a first position where the flexible section is parallel to the solid section and a second position where the flexible section forms an angle with the solid section.

16. The battery system of claim 8, wherein the busbar is a stacked busbar.

17. The battery system of claim 16, wherein layers of the stacked busbar are insulated from each other.

18. A method comprising:
   removing a removable portion of a lid, wherein:
      a fixed portion of the lid is arranged above a solid section of a busbar, and
      the removable portion of the lid is arranged above a flexible section of the busbar, wherein the removable portion at least partially covers power electronics that control distribution of electricity from a plurality of batteries;
   modifying a position of the flexible section of the busbar to expose electronics arranged below the flexible section of the busbar; and
   servicing one or more components corresponding to the exposed electronics.

19. The method of claim 18, wherein modifying the position of the flexible section comprises articulating the flexible section from a position parallel to the solid section to a position that forms an angle between the flexible section and the solid section.

* * * * *